United States Patent Office 3,187,282
Patented June 1, 1965

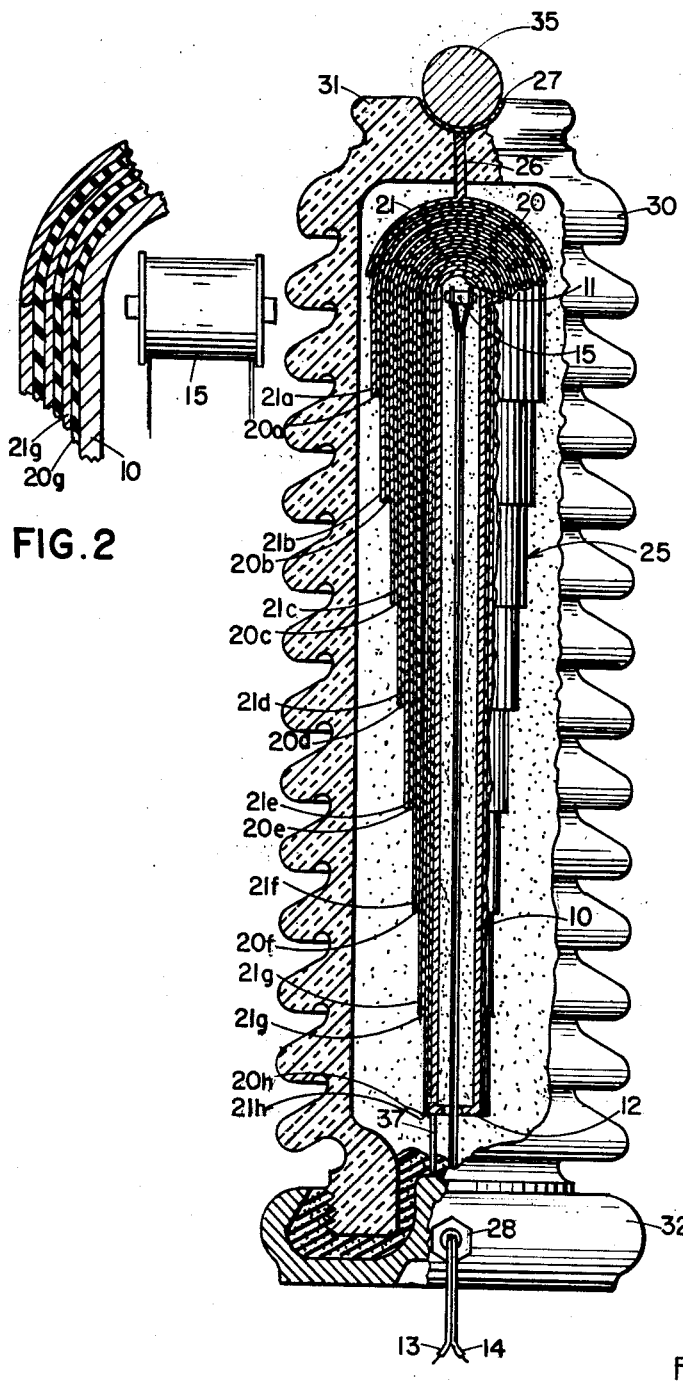

3,187,282
CURRENT PROBE FOR HIGH TENSION LINES
Robert H. Pierce, Duxbury, and Laurence B. Stein, Jr., Hingham, Mass., assignors to Sigma Instruments, Inc., a corporation of Massachusetts
Filed Sept. 24, 1962, Ser. No. 225,477
8 Claims. (Cl. 336—70)

This invention relates to pickups or probes for use in measuring an electrical quantity or quantities on a conductor such as used in a power transmission line, distribution line, bus bar or the like. More particularly, the invention is directed to a novel probe or pickup, and means by which it may be placed in close proximity to a high voltage conductor without causing excessive stresses or voltage gradients which might endanger or destroy the insulating means for supporting the conductor.

It is another object of the invention to provide means permitting supporting the novel probe by hand without danger to the life or health of the operator of the device.

It is well known in the art that, on high voltage power lines, electrical quantities may be measured through the use of instrument transformers such as current transformers and potential transformers. When these devices are used, they often are electrically connected to the high voltage circuit. Another measuring device is a pickup coil which is placed in an inductive relationship to the conductor on which a measurement is to be made. Such a device is disclosed and claimed in application for patent Serial No. 789,311, now abandoned, and in application Serial No. 301,516 which is a continuatin-in-part of abandoned application Serial No. 789,311.

One embodiment of pickup consists of an induction coil embedded or enclosed in solid insulating material, which material supports the conductor. The signal from the pickup is generally connected to amplifying or other control equipment which is generally at or near ground potential. Furthermore, for reasons of safety to equipment and personnel, one lead from the pickup is usually grounded. For these reasons, the body of the induction coil may be considered to be at or near ground potential.

The presence of a grounded object within the structure of a solid insulator and in close proximity to the high voltage conductor supported by the insulator causes distortion of the electric field normally surrounding such a conductor and, in turn, causes regions of high dielectric stress in the insulator. This stress may result in failure of the insulator. By employing the principles of the present invention, the electric field pattern may be altered so as to reduce the stresses which would normally appear when a grounded object is placed near the conductor.

Another object of the invention is to provide a probe or pickup of this type in which the electric field, for example, can be uniformly distributed along the length of a relatively elongated element of dielectric material having an operative end with a probe attached thereto and a base end having leads for connection to a suitable instrument.

A further object of the invention is to provide a probe or pickup of the foregoing type which is simple and inexpensive in construction and is readily portable and usable.

To these and other ends, the present invention comprises a relatively elongated and tubular electrically conductive element or shell having a closed operative end. This element is wrapped or otherwise covered with alternating layers of conductive material and dielectric material, each of which layers completely covers the closed or operative end of the tubular element. Considered from the outer surface inwardly, the alternating pairs of layers of insulating or dielectric material and conductive material progress in steps toward the base end of the probe. The purpose of the conductive layers is to distribute the electrical stress due to the electric field equally along the probe and along the sides thereof. Thereby, the shell may be grounded, or a grounded pickup coil can be placed within the tubular element close to the operative end thereof and leads may be brought out through the open base or manipulative end of the element.

For an understanding of the principles of the invention, reference is made to the following description of a typical embodiment thereof as illustrated in the accompanying drawings.

In the drawings:

FIG. 1 is a partial longitudinal or axial sectional view and elevational view of a current probe device embodying the invention; and FIG. 2 is a sectional view on an enlarged scale of a portion of the device.

Referring to FIG. 1, the pickup device embodying the invention is illustrated as comprising a relatively elongated tubular element or shell of electrically conductive material indicated at 10. Tubular element 10 has a closed operative end 11 and an open and preferably grounded base, support, or manipulative end 12. A grounded pickup coil 15 is mounted within the tubular element 10 adjacent the operative end 11 thereof with its axis transverse to the axis of the tubular element, and has opposite terminals connected to leads 13 and 14 which are brought out through the base end of the element 10 and one of which is generally grounded.

In accordance with the present invention, the outer surface of the element 10 is wrapped step-wise with alternating layers of dielectric material 20 and electrically conductive material 21. As illustrated, each of these layers extends around the closed or operative end 11 of the element 10. Furthermore, considered as pairs of layers of dielectric and electrically conductive material, and proceeding from the outer surface toward the surface of the element 10, the layers progressively increase in length step-wise toward the base or manipulative end 12 of element 10. Stated another way, the number of layers of alternating dielectric and electrically conductive material progressively decrease in number from the operative end 11 toward the base end 12 of the tubular element 10.

Thus, at the operative end of the element 10, there is an outer layer 21 of electrically conductive material. This layer 21 extends only a short distance beyond the closed end 11 of the element 10. Underlying the layer 21 is a pair of layers 20a and 21a, respectively dielectric and conductive, which extend further toward the base end 12 of the element 10. Similarly, pairs of layers of dielectric material 20b through 20h and electrically conductive material 21b through 21h are of progressively increasing length toward the base end of the tube, with the paired layers 20h and 21h extending to the base end 12 of the element 10 and the dielectric layer 20h being outward of the electrically conductive layer 21h at this operative end. Thereby, the electric field is relatively evenly distributed along the length of the probing element 10.

The described probe, as illustrated in FIG. 1, can be used with much higher voltages than can the usual probe comprising a porcelain insulator mounting a pickup coil. This is due to the fact that the electrical stresses are uniformly distributed along the length of the tubular element 10. In turn, and by virtue of the distribution of the electrical stress equally along the element 10 and along the sides thereof, the grounded pickup coil 15 can be positioned close enough to the test conductor so as to obtain an accurate reading.

The assembly generally designated 25 may be mounted within a porcelain insulator or the like generally designated 30. The top electrically conductive layer 21 is connected to a probe wire or connector 26 which is extended through the top end 31 of the insulator 30 for operative association or direct connection to a high voltage cable or conductor illustrated at 35. For example, the probe wire 26 may be connected to a curved contact plate 27 engaging one side of the cable. The leads 13 and 14 are brought out through a suitable bushing 28 in a conductive base 32 of the porcelain insulator 30. These leads may be connected to a suitable meter or indicating instrument or relay. The interior of the insulator 30 may be filled with a suitable potting compound, if desired. It should also be mentioned that such potting compound may be used within the interior of the element 10, also if so desired. The element 10 is advantageously grounded through a connection 37 to base 32.

While a specific embodiment of the invention has been shown and described in detail to illustrate the application of the principles of the invention, it should be understood that the invention may be embodied otherwise without departing from such principles.

What is claimed is:

1. A current probe for direct electrically conductive contact with a high voltage line, said probe comprising, in combination, a grounded relatively elongated electrically conductive tubular shell having a closed operative end and an open and grounded base end; a pickup coil mounted within said shell adjacent the operative end thereof; a pair of leads connected to respective opposite terminals of said coil and extending through said shell and brought out at the base end thereof; whereby a high dielectric stress will be present between said coil and a high voltage line in direct electrically conductive contact with said probe; alternating layers of insulating material and electrically conductive material completely covering the operative end of said shell, the ends of said layers of conductive material being at progressively increasing distances from the base end of said shell radially outwardly of said shell; the ends of the innermost layer of electrically conductive material and the innermost layer of insulating material being substantially adjacent the base end of said shell, and the outermost layer of insulating material and the outermost layer of electrically conductive material extending over only the operative end of said shell; and electric conductor means, including the outermost layer of electrically conductive material and a connector for direct electrically conductive contact with a high voltage line.

2. A current probe, as claimed in claim 1, in which said layers of insulating material are coextensive with said layers of conductive material so that the electrical field stress is distributed substantially uniformly along said shell.

3. A current probe, as claimed in claim 1, in which one of said coil leads is grounded.

4. A current probe, as claimed in claim 1, including a hollow insulator laterally enclosing and supporting said probe, said hollow insulator having an end adjacent the operative end of said shell; said electric conductor means extending through said hollow insulator end for such direct electrically conductive contact with a high tension line.

5. A current probe, as claimed in claim 4, including a potting compound filling the interior of said insulator.

6. A current probe, as claimed in claim 4, in which said insulator has its interior filled with a potting compound, and said tubular conductive shell is filled with a potting compound.

7. A current probe, as claimed in claim 4, comprising means, including an electrically conductive member, closing and sealing the opposite end of said hollow insulator; said leads extending in insulated relation through said electrically conductive member; and means electrically connecting the base end of said tubular shell to said electrically conductive member.

8. A current probe, as claimed in claim 1, in which the operative end of said tubular electrically conductive shell is hemispherical; each of said layers, except the outermost layer of electrically conductive material and the outermost layer of insulating material, including a hemispherical portion conforming to such operative end and cylindrical portions extending in parallel relation to the cylindrical wall of said shell.

References Cited by the Examiner
UNITED STATES PATENTS

| | | | |
|---|---|---|---|
| 1,489,370 | 4/24 | Steinberger | 336—70 |
| 2,468,125 | 4/49 | Silver | 324—126 X |
| 2,958,058 | 10/60 | Camilli | 336—84 X |

JOHN F. BURNS, *Primary Examiner.*